July 10, 1945.    A. VENDITTY    2,380,131
FASTENER
Filed June 4, 1942
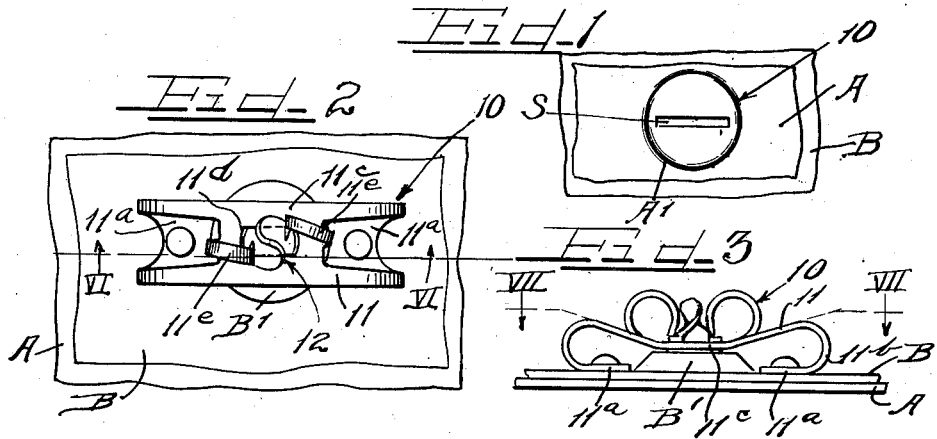
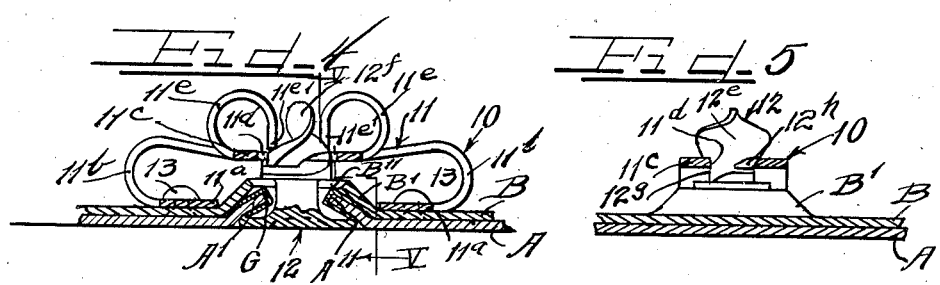
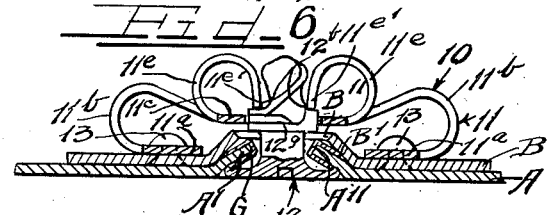
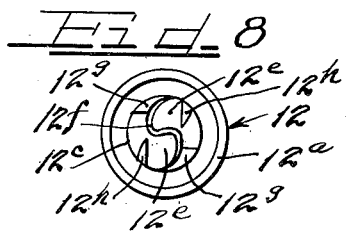
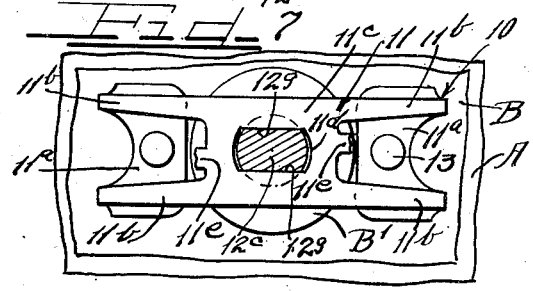
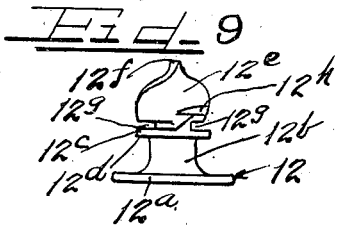
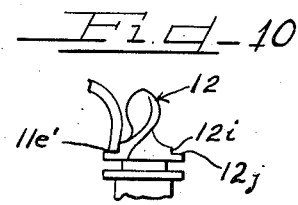
Inventor
Anthony Venditty
by Charles W. Hills Attys Patented July 10, 1945

2,380,131

UNITED STATES PATENT OFFICE 2,380,131

FASTENER

Anthony Venditty, Detroit, Mich., assignor to Thompson Products, Inc., a corporation of Ohio Application June 4, 1942, Serial No. 445,746

10 Claims. (Cl. 24—221)

This invention relates to fastening devices for detachably connecting parts, such as apertured plates.

Specifically, the invention relates to separable fasteners useful in detachably connecting airplane cowling, airplane inspection plates, automotive accessories, and the like.

The fasteners of this invention are composed of a receptacle and a stud. The stud and receptacle have cooperating locking instrumentalities.

The receptacle may be in the form of a spring plate with a stud-receiving aperture therein and with feet portions supporting the aperture-defining portion on an innermost apertured part in spaced relation from the aperture of the part. The stud member is adapted to be rotatably mounted in the aperture of an outermost part and has a shank portion extending through the apertures of both parts into the aperture of the spring plate. The portion of the shank which extends into the aperture of the spring plate has thread-like cam surfaces thereon adapted to engage the aperture-defining portion of the spring plate to deflect the same toward the innermost part on which the spring plate is mounted. This will draw the two parts together.

The spring plate has spring fingers thereon with free ends adapted to engage flat spots or abutment surfaces on the stud so as to prevent unauthorized rotation of the stud.

As the spring plate is deflected by threading of the stud therein, the free ends of the spring fingers are automatically moved into position so that they will tightly seat against the abutment surfaces provided on the stud when the stud has been rotated to locked position. In other words, as the aperture-defining portion of the spring plate is drawn toward the part on which the plate is mounted the fingers likewise are deflected to position their free ends closer together so that they will have better gripping engagement with the flat spots on the stud. This feature, however, is not essential to the operation of the fasteners since the fingers overlie the aperture of the spring plate and have their free ends deflected away from each other as the stud is threaded into the aperture. Such lateral deflection of the free ends of the spring fingers will, of course, place the fingers under load so that they will have good gripping action against the flat spots or abutment shoulders on which they are seated when the stud is rotated to completely locked position.

The thread or cam surface on the stud is arranged so that the stud will completely fasten and unfasten the parts upon reverse quarter-turn rotation. To this end, the stud shank is helically grooved so as to provide double tapered threads starting from a common point at the free end of the shank and diverging along helical paths outwardly toward the periphery of the shank portion to undercut slots. The spring plate aperture is wide enough to cooperate with the tapered threads without being subjected to a spreading action. In other words, the stud can be threaded into the aperture of the spring plate and held in this aperture by cooperation between the undercut grooves and the aperture-defining walls. When the stud is rotated to seat the aperture-defining walls in the undercut grooves, portions of the stud will overlap the spring plate on both sides of the plate.

The spring fingers are effective in holding the stud against unauthorized rotation so as to maintain the parts in fastened relation even though the assembly is subjected to extreme vibration and to other forces tending to unfasten the parts. However, the spring fingers can be deflected outwardly so as to release their grip on the stud whenever the stud is manually rotated to unfasten the parts.

It is, then, an object of this invention to provide fasteners for detachably connecting a plurality of parts and for holding said parts in connected relation even though the assembly is subjected to extreme vibration tending to disconnect the parts.

A still further object of this invention is to provide a fastener which locks and unlocks upon reverse quarter-turn rotation of a stud and which is equipped with spring fingers preventing unauthorized unlocking of the parts.

A still further object of the invention is to provide a separable fastener especially adapted for use in securing airplane cowling in position on an airplane which fastener includes a deflectable receptacle equipped with spring fingers to hold a locking stud in locked position.

Another object of this invention is to provide a receptacle for cowl fasteners which is resiliently deflectable for drawing together the parts to be fastened and which has locking means brought into better locking position whenever the receptacle is deflected.

A specific object of the invention is to provide a fastener composed of a spring plate for attachment to an innermost part having a stud-receiving aperture and spring arms with free end portions overlying said aperture to cooperate with a stud inserted through the aperture for holding the stud against unauthorized rotation.

A still further object of the invention is to provide inexpensive spring members for cowling fasteners which members can be stamped from strip metal stock.

Other and further objects of the invention will be apparent to those skilled in the art from the following detailed description of the annexed sheet of drawings which, by way of preferred example only, illustrates one embodiment of the invention.

On the drawing:

Figure 1 is a top plan or outside plan view of a pair of plates held together by a fastener according to this invention and illustrating the head of the fastener stud seated in an embossed dimple of the outer plate.

Figure 2 is a bottom plan or inside plan view of the pair of plates shown in Figure 1 and illustrating the receptacle of the fastener mounted on the inner plate and cooperating with the stud of the fastener to hold the plates together.

Figure 3 is a side elevational view of the assembly shown in Figures 1 and 2.

Figure 4 is a side elevational view, with parts shown in vertical cross section, illustrating the assembly of Figures 1 to 3 just before the stud is rotated to completely locked position, for showing the manner in which the spring arms of the receptacle ride on the cam surfaces of the stud as the receptacle is being deflected by the stud threads.

Figure 5 is a cross-sectional view, with parts in elevation, taken along the line V—V of Figure 4.

Figure 6 is a vertical cross-sectional view, with parts in elevation, taken along the line VI—VI of Figure 2.

Figure 7 is a horizontal cross-sectional view, with parts in elevation, taken along the line VII—VII of Figure 3.

Figure 8 is a plan view of the stud shown in Figures 1 to 7 looking down from the apex of the stud shank.

Figure 9 is a side elevational view of the stud shown in Figure 8.

Figure 10 is an enlarged fragmentary side elevational view, similar to Figure 3 but on a larger scale, to illustrate the notches of the stud and the manner in which the spring fingers are seated in the notches.

As shown in the drawing:

In Figures 1 to 7 inclusive the reference numeral 10 designates generally a fastener according to this invention, detachably connecting a pair of apertured metal plates including an outer plate A such as, for example, an airplane cowling piece, and an inner plate B such as, for example, an airplane body part or cowling mounting piece.

The plate A is embossed or dimpled as at A' and the embossed portion A' defines a circular aperture A'' at the bottom thereof.

The plate B is embossed or dimpled as at B' and the embossed portion B' defines a circular aperture B'' at the bottom thereof. A grommet G is seated in the aperture A'' and has legs straddling the faces of the dimple A' so as to fix the grommet in the dimple.

As best shown in Figures 4 and 6, the dimple A' and grommet G thereon fit into the dimple B' so that the inner face of the plate A and the outer face of the plate B can be drawn into abutting engagement.

The fastener 10 is composed of a receptacle or spring member 11 mounted on the inner face of the inner plate B, and a locking stud 12 rotatably mounted in the grommet G carried by the outer plate A.

The receptacle 11 is conveniently stamped from a flat piece of metal and has a pair of feet 11a, 11a on opposite sides of the dimple B'. The feet 11a, 11a are apertured to receive therethrough the shanks of rivets 13 which secure the receptacle to the plate B. As shown in Figures 4 and 6, these rivets 13 extend through holes in the plate B and have head portions seated in counterbored recesses in the plate B so as to be in flush relation with the outer face of this plate.

Each foot 11a, 11a has a pair of upstanding spring legs 11b, 11b which curve laterally outwardly, upwardly and then laterally inwardly to an apertured plate portion 11c. The spring legs 11b carry this plate portion 11c in spaced relation from the aperture B'' of plate B and in alignment with this aperture. The plate portion 11c has a central rectangular shaped aperture 11d therethrough.

Spring fingers 11e extend from the edges of the plate portion 11c between the legs 11b in a curled path to provide free end portions 11e' at least partially overlying the aperture 11d of the plate portion 11c.

The stud 12, as best shown in Figures 8 and 9, has a head portion 12a, a cylindrical shank portion 12b extending from the head 12a, and an enlarged end portion 12c on the shank portion 12b. This enlarged end portion 12c provides an abutment shoulder 12d and is helically grooved or threaded to provide diverging helical faces 12e extending from a point 12f at the free end of the stud along diverging paths to grooves 12g, 12g cut perpendicularly to the axis of the stud shank.

A notch 12h is cut in each helical face 12e in advance of the groove 12g. These notches provide flat faces or abutment shoulders 12i parallel with the axis of the stud shank for abutting engagement with the free ends 11e' of the spring fingers. As best shown in detail in Figure 10, the notches have the vertical walls or shoulders 12i and horizontal walls or platforms 12j.

The stud head 12a is adapted to fit into the dimple A' of the outer plate A and the stud shank 12b is adapted to fit freely through the grommet G carried by this dimple. The shoulder 12d on the shank, however, is of larger diameter than the internal diameter of the grommet so that the stud is rotatably held in the plate. The stud may be equipped initially with the grommet, and the grommet can then be spun into seating engagement with the dimple A' so as to mount the stud in the plate.

The point or free end 12f of the stud can freely enter the aperture 11d of the receptacle and the stud can then be rotated in this aperture 11d until the plate portion 11c of the receptacle is drawn down into the slots 12g. The helical faces 12e will freely ride in the aperture 11d without spreading the flat sides of the aperture but, when the stud has been rotated sufficiently so that the flat sides of the aperture are seated in the slots 12g, the divergent ends of the cam surfaces will overlie the plate 11c. The stud end 12c thus has screw thread cooperation in full line contact at all times with the plate portion 11c as best illustrated in Figures 4 to 6. The line contact will wear into good surface contact upon repeated locking and unlocking operations to give an actual "wearing in" which improves with use. Figures 4 and 5 show the threading of the stud into the plate portion 11c prior to complete rotation into fully locked position. It will be noted that the plate portion 11c is being deflected toward the plate B or head of the stud so that it is inwardly bowed by the time it reaches fully fastened position as shown in Figure 6.

This inward drawing or deflection of the receptacle 11 causes the free ends of the fingers 11e to curl downwardly and inwardly toward each other. As illustrated in Figures 4 and 6, as the stud is being rotated into locked position, the ends 11e of the spring fingers ride along the helical faces 12e until they reach the notched-out portions 12h. When the fingers reach these portions, the stud is rotated into locked position with the flat side walls of the aperture 11d on the receptacle being seated in the slots 12g and the thrusting engagement of the finger ends 11e' on the flat spots or vertical shoulders 12i of the stud will resist further rotation of the stud in either direction. In addition, the rectangular hole 11d has a width which prevents rotation of the stud beyond locked position since the portion 12c of the stud is wider than the hole.

The spring receptacle 11 can be deflected under tension load beyond locked position only until the plate portion 11c thereof thrusts against the dimple B'. This dimple thus acts as a backing up member for the spring.

From the above descriptions it will be understood that the fasteners of this invention include an apertured spring plate or receptacle adapted to threadedly receive a locking stud. The spring 11 has fingers 11e with ends 11e' thereon which seat against the flat shoulders 12i and on the flat platforms 12j of the notches provided in the locking stud to prevent unauthorized rotation of the stud. The stud head is slotted as shown at "S" for engagement by a screwdriver to effect the rotation. It will be seated in full locking engagement with its receptacle upon quarter-turn rotation to fasten the parts together. Reverse quarter-turn rotation will unfasten the parts to release the stud from the receptacle.

It will, of course, be understood that various details of the invention may be varied through a wide range without departing from the principles for this invention and it is, therefore, not the purpose to limit the patent granted hereon otherwise than necessitated by the scope of the appended claims.

I claim as my invention:

1. A fastener adapted for detachably connecting a plurality of apertured parts comprising a receptacle adapted to be fixedly mounted on the innermost part and having a stud-receiving aperture adapted to overlie the aperture of said innermost part in spaced relation therefrom, a spring finger on said receptacle, a stud adapted to be rotatably mounted in the aperture of the outermost part having a helical cam portion rotatable into the aperture of the receptacle to engage and deflect the aperture-defining receptacle portion toward the part aperture to draw the parts together, and an abutment on said stud adapted to thrust against said spring finger on the receptacle for holding the stud against unauthorized rotation.

2. A fastener comprising an apertured receptacle, spring fingers on said receptacle having deflectable free end portions, a stud having a portion adapted to be engaged in the aperture of the receptacle, and opposed notches on said stud forming abutments for the free end portions of said spring fingers to lock the stud against unauthorized rotation.

3. A fastener comprising a female member having an apertured central plate portion with laterally extending spring legs, feet on the ends of said legs for attaching the fastener to a part, a stud having a helical cam portion insertable in said aperture of the female member, said stud adapted to be rotated into locking engagement with the female member while deflecting said spring legs, and spring fingers on said female member engageable with the stud to lock the stud against unauthorized rotation.

4. A fastener comprising coengaging elements, one of said elements being slotted, the other of said elements being rotatable and having a head at one end and helical blades at the other end for entry into the slotted element, said slotted element having spring fingers overlying the slot therein in the path of the helical blades, and said helical blades having shoulders thereon for locking engagement with the spring fingers to hold the rotatable element against unauthorized rotation.

5. A fastening device comprising coengaging elements, one of said elements being resilient and slotted, the other of said elements being rotatable and having a head at one end and helical blades at its other end for entry in said slotted element into engagement therewith, spring fingers on the resilient slotted element in the path of the helical blades, and notches in said helical blades providing abutment shoulders for the spring fingers to hold the rotatable element against unauthorized rotation, said rotatable element deflecting the resilient element to position the fingers in firm engagement with the notches.

6. A fastener adapted for fastening together a plurality of apertured parts which comprises a spring plate having an aperture therethrough adapted to overlie the apertures of the parts to be fastened, spring legs extending laterally from said plate, feet on the ends of said legs for attaching the plate to a part on opposite sides of the aperture of said part, spring fingers on said spring plate extending between the spring legs and curved to present free ends in overlying relation to the aperture of the spring plate, a stud adapted to be rotatably mounted in the aperture of the outermost part having a shank extending through the apertures of the parts, an enlarged end portion on said shank having opposed helical blade surfaces diverging from a common end on the shank to diametrically opposed slots normal to the axis of the shank, notches in said helical blades in advance of said slots, said helical blades adapted to be rotated through the aperture of the spring plate to draw the spring plate toward the innermost part, said slots adapted to receive the spring plate therein for holding the plate in deflected position, and said spring fingers riding on said helical blades and being drawn toward each other during said deflecting of the spring plate for thrusting engagement against the notched portions in the blades to hold the stud against unauthorized rotation.

7. A female part for a fastener comprising a spring plate having a stud-receiving aperture therethrough and feet for holding the aperture-defining portion of the plate in spaced relation from a part to be fastened, said plate having circularly bent spring fingers with free ends overlying the aperture and deflectable into gripping engagement with a member inserted through the aperture for holding said member against rotation.

8. A locking stud for a fastener comprising a headed member having a shank portion with helical blades thereon diverging from a common point on the free end of the shank to oppositely disposed slots formed perpendicularly of the axis of the shank, and notches in said blade providing abutment surfaces in advance of said slots.

9. A locking stud for a fastener comprising a member having a head portion, a cylindrical shank extending from said head, an enlarged end portion on said shank, helical grooves in said enlarged portion, opposed slots normal to the axis of the shank in said enlarged portion communicating with said grooves, and notches in the grooves of said enlarged portion in advance of said slots defining shoulders parallel with the axis of the stud.

10. A fastener adapted to detachably connect a plurality of members having embossed apertured dimples in nested relation which comprises a spring receptacle adapted to be mounted on the innermost member to straddle the dimple, an apertured plate area on said spring receptacle adapted to overlie the dimple, a stud having a head adapted to seat in the dimple of the outermost member, a shank on said stud adapted to extend through the apertures of the dimples into the aperture of the plate area of the spring receptacle, and locking instrumentalities on the stud shank cooperating with the plate area to deflect said area toward the dimple on the innermost member, said dimple adapted to abut said plate area to resist further deflection, and said aperture of the plate area cooperating with the locking instrumentalities of the stud to resist rotation of the stud beyond locked position.

ANTHONY VENDITTY.